(12) United States Patent
Kassai et al.

(10) Patent No.: US 10,174,705 B2
(45) Date of Patent: Jan. 8, 2019

(54) INTERNAL COMBUSTION ENGINE CONTROL DEVICE AND INTERNAL COMBUSTION ENGINE CONTROL METHOD

(71) Applicant: NISSAN MOTOR CO., LTD., Yokohama-shi, Kanagawa (JP)

(72) Inventors: Masaharu Kassai, Kanagawa (JP); Kentarou Yamano, Kanagawa (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 0 days.

(21) Appl. No.: 15/554,491

(22) PCT Filed: Mar. 4, 2015

(86) PCT No.: PCT/JP2015/056401
§ 371 (c)(1),
(2) Date: Aug. 30, 2017

(87) PCT Pub. No.: WO2016/139784
PCT Pub. Date: Sep. 9, 2016

(65) Prior Publication Data
US 2018/0058364 A1    Mar. 1, 2018

(51) Int. Cl.
*F02D 41/00* (2006.01)
*F02D 41/40* (2006.01)
(Continued)

(52) U.S. Cl.
CPC ............ *F02D 41/40* (2013.01); *F02D 41/04* (2013.01); *F02D 41/047* (2013.01); *F02D 41/1498* (2013.01); *F02D 41/22* (2013.01); *F02D 41/402* (2013.01); *F02D 35/021* (2013.01); *F02D 41/34* (2013.01); *F02D 2200/02* (2013.01); *F02D 2250/11* (2013.01); *F02D 2250/18* (2013.01); *F02D 2250/26* (2013.01)

(58) Field of Classification Search
CPC .......... F02D 41/40; F02D 41/04; F02D 41/22; F02D 2200/02; F02D 2250/18
See application file for complete search history.

(56) References Cited

U.S. PATENT DOCUMENTS 4,745,901 A * 5/1988 Reifenberger .......... F02D 41/04
123/406.47
6,371,076 B1 * 4/2002 Kamijo ................. F02D 35/027
123/295

(Continued)

FOREIGN PATENT DOCUMENTS

EP    1 983 165 A1    10/2008
EP    2 677 151 A1    12/2013
(Continued)

*Primary Examiner* — Hieu T Vo
*Assistant Examiner* — Sherman Manley
(74) *Attorney, Agent, or Firm* — Drinker Biddle & Reath LLP

(57) ABSTRACT

A control device of an internal combustion engine includes an estimating means adapted to estimate an amount of a mixture of fuel and oil dispersing according to a movement of a piston within a cylinder; and a limiting means adapted to limit an upper limit torque (UT) of an internal combustion engine according to the estimated amount of the mixture.

8 Claims, 20 Drawing Sheets

(51) Int. Cl.
  *F02D 41/22*  (2006.01)
  *F02D 41/04*  (2006.01)
  *F02D 41/14*  (2006.01)
  F02D 41/34  (2006.01)
  F02D 35/02  (2006.01)

(56) References Cited

U.S. PATENT DOCUMENTS

| | | | | |
|---|---|---|---|---|
| 6,748,927 B2* | 6/2004 | Joos | ............ | F02D 41/20 123/478 |
| 7,063,070 B2* | 6/2006 | Mashiki | ............ | F02D 41/047 123/299 |
| 7,121,250 B2* | 10/2006 | Yokoyama | ............ | F02D 41/0027 123/196 R |
| 7,357,101 B2* | 4/2008 | Boyarski | ............ | F02M 25/0228 123/1 A |
| 7,412,966 B2* | 8/2008 | Lewis | ............ | F02D 41/0025 123/1 A |
| 7,640,912 B2* | 1/2010 | Lewis | ............ | F01N 11/007 123/299 |
| 8,132,555 B2* | 3/2012 | Lewis | ............ | F02D 41/0025 123/295 |
| 8,639,432 B2* | 1/2014 | Matsuo | ............ | F02D 35/02 123/406.11 |
| 8,949,003 B2* | 2/2015 | Okada | ............ | F02D 35/02 123/436 |
| 2003/0010324 A1* | 1/2003 | Joos | ............ | F02D 41/20 123/478 |
| 2005/0268884 A1* | 12/2005 | Yokoyama | ............ | F02D 41/0027 123/299 |
| 2006/0016429 A1* | 1/2006 | Mashiki | ............ | F02D 41/047 123/431 |
| 2007/0006849 A1 | 1/2007 | Mashiki | | |
| 2007/0119413 A1* | 5/2007 | Lewis | ............ | F02D 41/0025 123/295 |
| 2007/0119415 A1* | 5/2007 | Lewis | ............ | F01N 11/007 123/295 |
| 2007/0119416 A1* | 5/2007 | Boyarski | ............ | F02M 25/0228 123/304 |
| 2007/0119422 A1* | 5/2007 | Lewis | ............ | F02D 41/0025 123/431 |
| 2011/0246049 A1* | 10/2011 | Matsuo | ............ | F02D 35/02 701/111 |
| 2013/0333662 A1* | 12/2013 | Okada | ............ | F02D 35/02 123/319 |
| 2014/0297164 A1 | 10/2014 | Sawdon et al. | | |
| 2015/0013637 A1 | 1/2015 | Kassai | | |
| 2016/0123248 A1 | 5/2016 | Kassai et al. | | |

FOREIGN PATENT DOCUMENTS

| | | |
|---|---|---|
| JP | 2007-107458 A | 4/2007 |
| JP | 2009-92006 A | 4/2009 |
| JP | 2011-231741 A | 11/2011 |
| WO | WO-2013/133112 A1 | 9/2013 |
| WO | WO 2014/199667 A1 | 12/2014 |

* cited by examiner

INTERNAL COMBUSTION ENGINE CONTROL DEVICE AND INTERNAL COMBUSTION ENGINE CONTROL METHOD

TECHNICAL FIELD

The present invention relates to a control device for an internal combustion engine and a control method for an internal combustion engine.

BACKGROUND ART

JP2011-231741A discloses changing a torque limited region according to an oil amount flowing in from a surge tank. This prevents the occurrence of abnormal combustion caused by oil outside the cylinder.

SUMMARY OF INVENTION

If oil is dispersed within the cylinder of the internal combustion engine, this oil would serve as an ignition source, and abnormal combustion would occur. However, the oil within the cylinder stays within an amount that forms an oil film on the wall surface inside the cylinder; hence, this will only be a small amount, and is considered rare to actually become dispersed. On the other hand, fuel is injected from an injector, and thus the fuel adhered to the wall surface inside the cylinder is relatively larger in amount than the oil. As the fuel adhered to the wall surface inside the cylinder increases, regardless that only a small amount of oil is adhered to the wall surface inside the cylinder, the oil will be dispersed within the cylinder as a mixture with the fuel, caused by a piston ring.

As such, the oil that normally does not disperse that much is dispersed within the combustion chamber as a mixture with the fuel, caused by the fuel accumulated on the wall surface inside the cylinder. Since the oil contained in the mixture also serves as a source for the occurrence of abnormal combustion within the cylinder in the internal combustion engine, abnormal combustion may easily occur if the mixture is dispersed. Under such circumstances, it is preferable to prevent the occurrence of abnormal combustion within the cylinder in internal combustion engines.

An object of the present invention is to prevent the occurrence of abnormal combustion within a cylinder in internal combustion engines.

According to one embodiment of this invention, a control device of an internal combustion engine comprises an estimating means adapted to estimate an amount of a mixture of fuel and oil dispersing according to a movement of a piston within a cylinder; and a limiting means adapted to limit a upper limit torque of an internal combustion engine according to the estimated amount of the mixture.

DESCRIPTION OF EMBODIMENTS

The following describes an embodiment of the present invention, with reference to the attached drawings.

First Embodiment

Figure 1:
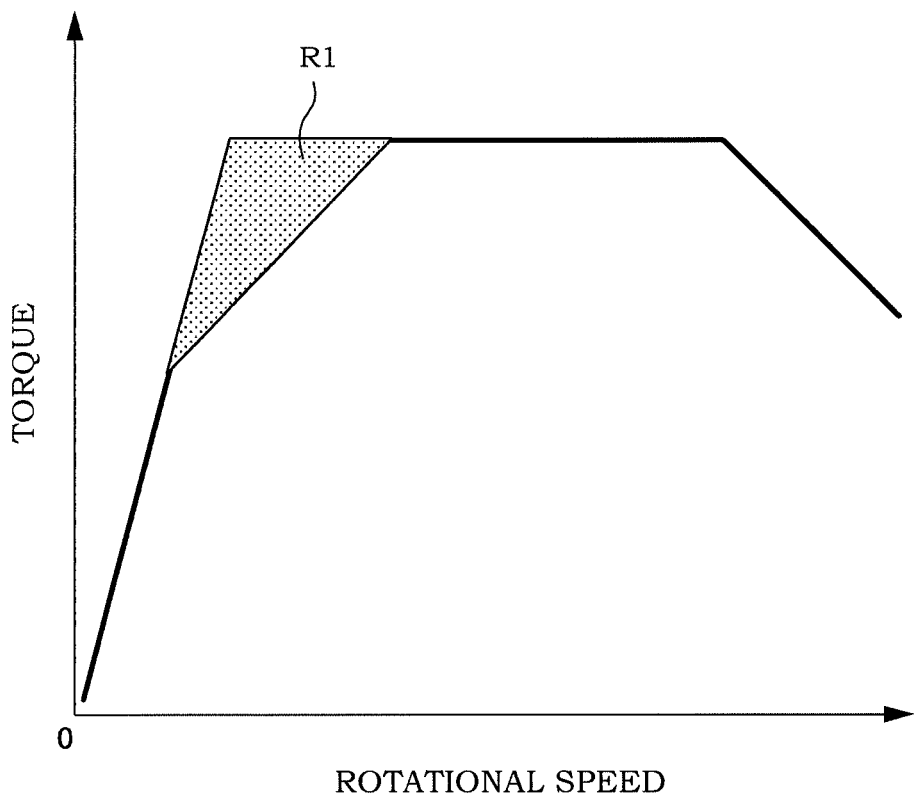
FIG. 1 is an explanatory drawing describing a low-rotation high-load range.

FIG. 1 is an explanatory drawing describing a low-rotation high-load range. FIG. 1 shows revolution speeds and torques of an internal combustion engine. Generally, pre-ignition may easily occur at a range in which a revolution speed of an internal combustion engine is low and in a range in which a high torque is required. This range in which the revolution speed of the internal combustion engine is low and which requires a high torque is hereinafter called "low-rotation high-load range R1".

Pre-ignition is a phenomenon in which air/fuel mixture in the combustion chamber starts its combustion (flame propagation) before an ignition plug fires. When combustion is carried out at an earlier timing than the ignition timing set according to an engine operating state, self-ignition of unburnt gas is promoted and abnormal combustion of a large intensity (super knocking) occurs. Therefore, the pre-ignition obstructs an operation at high output of the internal combustion engine.

The following describes a mechanism of pre-ignition occurrence.

Figure 2:
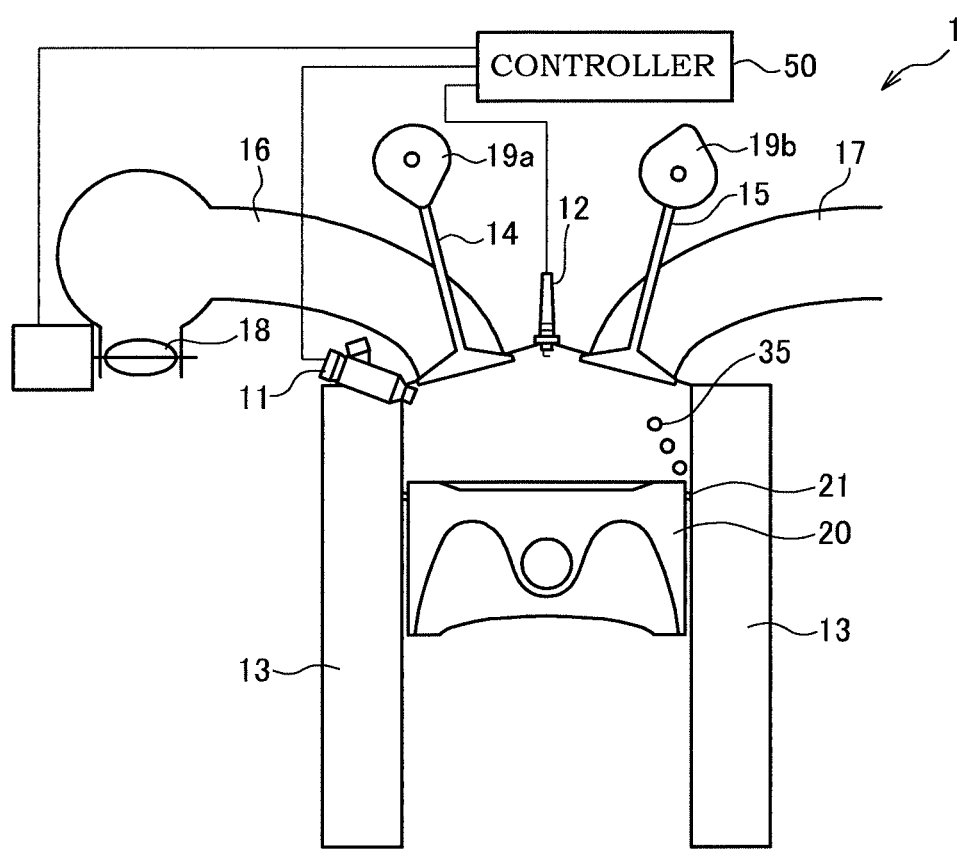
FIG. 2 is a sectional view of an internal combustion engine describing a pre-ignition occurring mechanism.

FIG. 2 is a sectional view of an internal combustion engine, describing a pre-ignition occurring mechanism. An internal combustion engine 1 includes an injector 11 (corresponding to fuel injection means), an ignition plug 12, a cylinder 13, an intake valve 14, and an exhaust valve 15. Moreover, the internal combustion engine 1 includes an intake manifold 16, an exhaust manifold 17, a throttle valve 18, a camshaft 19a on an intake valve 14 side, and a camshaft 19b on an exhaust valve 15 side. Furthermore, the internal combustion engine 1 includes a piston 20 and a piston ring 21.

The injector 11, the ignition plug 12, and the throttle valve 18 are connected to a controller 50 that includes an engine control unit and like components. The controller 50 controls fuel injection of the injector 11. Moreover, the controller 50 controls an ignition timing of the ignition plug 12. Furthermore, the controller 50 controls a position of the throttle valve 18, and observes this position.

The injector 11 in the present embodiment is a multihole injector. The injector 11 is disposed on an upper edge side of the cylinder 13 in the internal combustion engine 1, and is disposed so that its injection hole is faced diagonally downwards. Namely, the injector 11 has its injection hole facing a wall surface of the cylinder 13.

When fuel is injected from the injector 11 configured as such, the fuel may reach the wall surface of the cylinder 13. On the wall surface of the cylinder 13, an oil film is formed by oil, to allow for sliding with the piston 20. Accordingly, a mixture of oil and fuel is generated on the wall surface of the cylinder 13, and this mixture becomes dispersed within the combustion chamber by the piston ring 21 rising with the piston 20.

Figure 3:
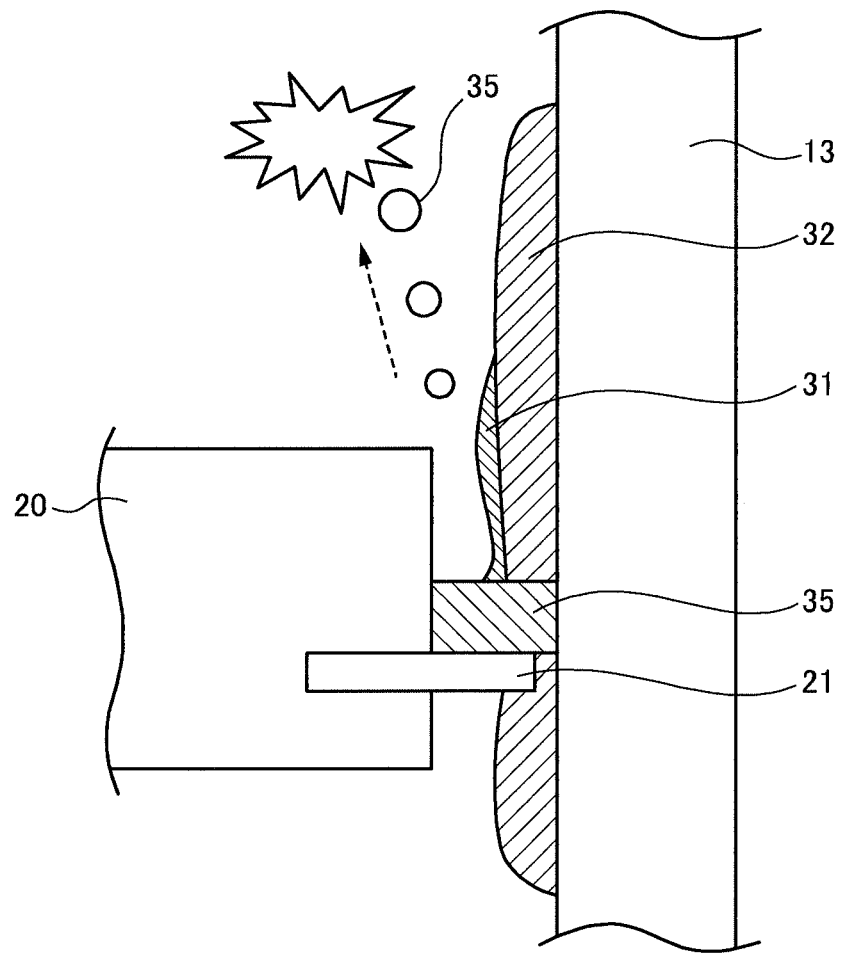
FIG. 3 is a partially enlarged view of an internal combustion engine, describing a pre-ignition occurring mechanism.

FIG. 3 is a partially enlarged view of an internal combustion engine, describing a pre-ignition occurring mechanism. The following describes a course of mixture dispersing, with reference to FIG. 3. FIG. 3 shows the cylinder 13, the piston 20, and the piston ring 21.

Moreover, FIG. 3 shows a state in which oil 32 for lubricity is adhered to the wall surface of the cylinder 13. Furthermore, FIG. 3 shows a state in which fuel 31 injected from the aforementioned injector 11 adheres in a manner overlapping the oil 32. These fuel 31 and oil 32 mixed together generates a mixture 35. Furthermore, the mixture 35 accumulates on and around the piston ring 21.

Generally, the oil 32 adhered to the wall surface of the cylinder 13 is of a small amount since the oil is just to the extent to form an oil film, and viscosity thereof is also high. Therefore, even if the piston 20 rises, the oil 32 remains adhered to the wall surface of the cylinder 13, and the oil 32 rarely becomes dispersed within the cylinder.

However, as described above, the fuel 31 injected from the injector 11 may reach the wall surface of the cylinder 13. The fuel 31 having reached the wall surface of the cylinder 13 mixes with the oil 32 adhered to the wall surface of the cylinder 13, and becomes the mixture 35. The amount of fuel 31 reaching the wall surface of the cylinder 13 is larger than that of the oil 32. Moreover, although the viscosity of the oil 32 is high, the viscosity of the fuel 31 is low, and thus the mixture 35 decreases in viscosity.

Since the viscosity of the mixture 35 is low, the adhesiveness against the wall surface of the mixture 35 is weak. Therefore, the mixture 35 becomes dispersed upwards due to the piston ring 21 rising together with the piston 20. Furthermore, the dispersed amount thereof increases as the amount of the fuel 31 reaching and accumulated on the wall surface of the cylinder 13 increases. In particular, when the accumulated amount of the fuel 31 is large, not only the amount of the mixture 35 itself increases, but also the viscosity of the mixture 35 decreases; hence, it is considered that the dispersed amount will drastically increase.

The oil 32 contains various types of additives. Therefore, in a case in which the mixture 35 is dispersed within the cylinder, liquid drops of the dispersed mixture 35 will serve as an ignition source for pre-ignition. Since the dispersed amount of the mixture 35 increases as the accumulated amount of the fuel 31 increases, the possibility that the pre-ignition would occur increases with a larger accumulated amount of the fuel 31. Moreover, a possibility that knocking (super knocking) may occur caused by this pre-ignition would also increase.

As described above, it is desirable to prevent the pre-ignition caused by mixture dispersion, since the pre-ignition obstructs the operation of the internal combustion engine 1 at high output.

Figure 4:
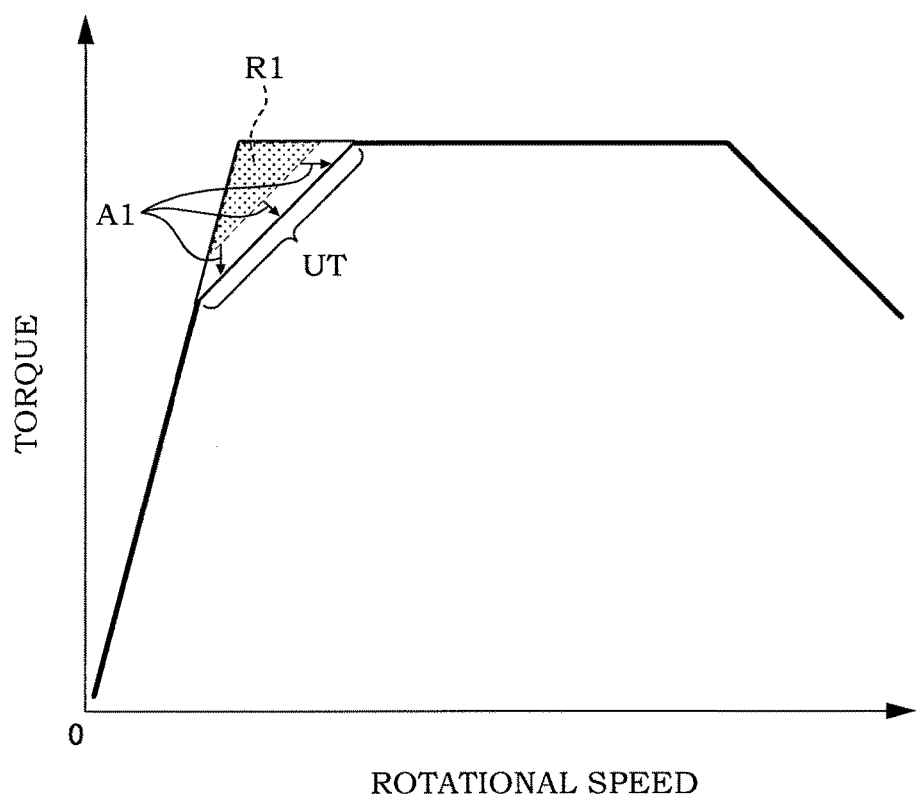
FIG. 4 is an explanatory drawing of a concept of upper limit torque limitation, in the present embodiment.

FIG. 4 is an explanatory drawing of a concept of a upper limit torque limitation, in the present embodiment. FIG. 4 shows a upper limit torque with respect to revolution speeds of the internal combustion engine 1. As described above, the pre-ignition may easily occur in the low-rotation high-load range R1.

Accordingly, the controller 50 (corresponding to the control device of the internal combustion engine) estimates a mixture amount of the fuel and oil that disperses according to movement of the piston within the cylinder 13 (it is equivalent to an estimation means). Moreover, the controller 50 limits a upper limit torque UT (FIG. 4) of the internal combustion engine, according to the estimated mixture amount (corresponding to limiting means). In particular, at this time, the controller 50 limits the upper limit torque UT of the internal combustion engine lower (direction shown by arrow A1 of FIG. 4) as the estimated mixture amount increases.

As described above, the more the amount of the mixture is dispersed, the more easily the pre-ignition may occur. In particular, the pre-ignition may easily occur in the low-rotation high-load range R1. However, the controller 50 of the present embodiment estimates the dispersed amount of mixture according to the movement of the piston, and limits the upper limit torque of the internal combustion engine according to the estimated mixture amount.

The controller 50 cannot control to output a torque higher than this upper limit torque, in controlling the internal combustion engine 1. That is to say, even if a request is generated to output a torque higher than the upper limit torque, the controller 50 for example limits the injected fuel amount and does not respond to this request. Therefore, by setting the upper limit torque as such, the controller 50 can prevent the occurrence of abnormal combustion, by operating the internal combustion engine 1 only in ranges in which the pre-ignition cannot easily occur.

The following describes the settings for this upper limit torque in more details.

Figure 5:
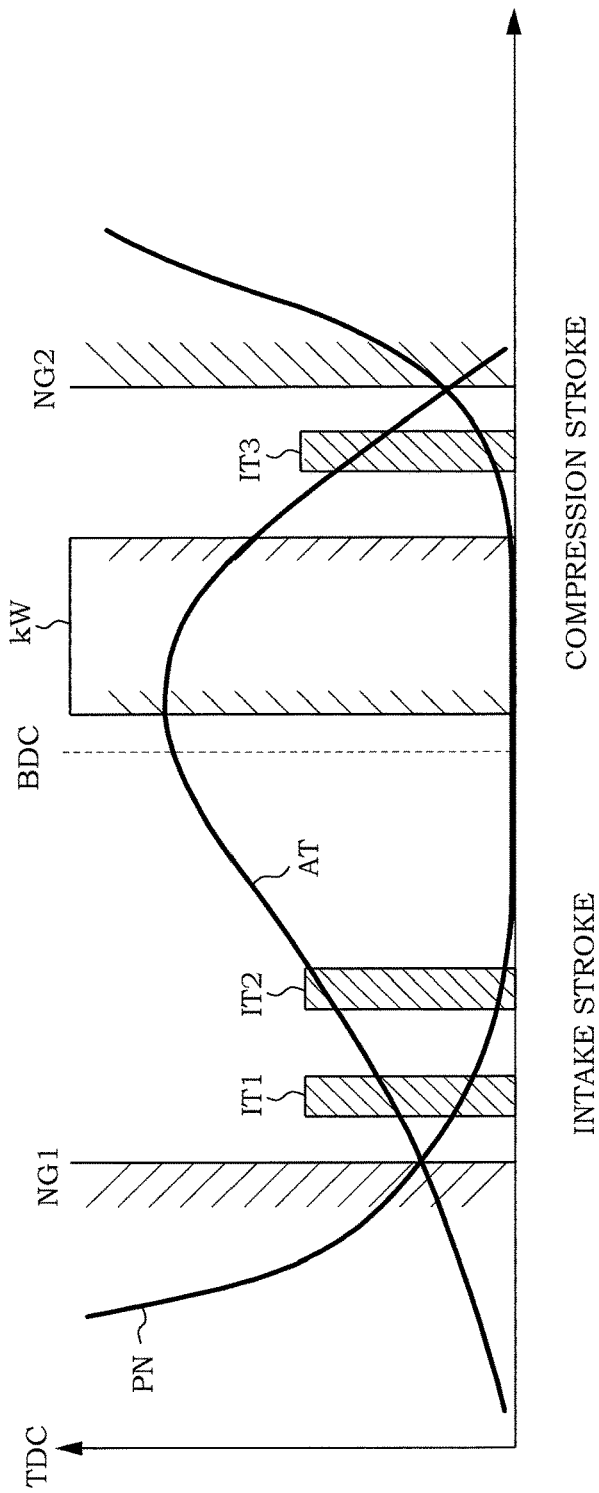
FIG. 5 is an explanatory drawing of injection timings in fuel multi-stage injections.

FIG. 5 is an explanatory drawing of injection timings in multistage injections of the fuel. FIG. 5 shows injection timings of fuel from a top dead center of an intake stroke to a top dead center of a compression stroke. No fuel is injected in an expansion stroke or an exhaust stroke, and thus descriptions thereof have been omitted.

Moreover, FIG. 5 shows adhesion properties AT and piston wet properties PN. The adhesion properties AT represent that the fuel easily adheres to the wall surface of the cylinder 13 with a higher value thereof. Moreover, the piston wet properties PN represent that the fuel easily adheres to the piston with a higher value thereof.

In the internal combustion engine 1 of the present embodiment, fuel is injected within one stroke at three timings, first injection IT1, second injection IT2, and third injection IT3, as shown in FIG. 5. The injection timings of the fuel are the two times being the first injection IT1 and second injection IT2 in the intake stroke, and once in the compression process being the third injection IT3.

The reason why fuel injection is divided into several stages is because the amount of fuel reaching the wall surface of the cylinder 13 becomes smaller when the injection is divided into several times. The amount of fuel reaching the wall surface of the cylinder 13 relates to a reaching ability of the fuel to the wall surface of the cylinder 13. With a higher reaching ability of the fuel to the wall surface of the cylinder 13, the amount of fuel reaching the wall surface of the cylinder 13 would also increase. The reaching ability of the fuel to the wall surface of the cylinder 13 may also be called spray penetration of fuel.

By having the fuel injection be of multistage injection, the injected amount of fuel per timing is reduced, and thus the fuel does not reach the wall surface of the cylinder 13 easily. In comparison, attempting to inject the fuel of the amount of three stages in just one stage would cause the amount of the fuel injected per timing to increase, and this fuel would fly as like a bulk. Since it is difficult for the fuel flying as one bulk to atomize, the fuel may reach the wall surface of the cylinder 13 easily.

Moreover, the injection timings are set as shown in FIG. 5 for the following reasons. First, there is a demand for injecting fuel when values of both the adhering property AT and the piston wet property PN are low. This is because the fuel easily accumulates on the wall surface of the cylinder 13 when the adhering property AT is high, and the fuel easily adheres to the piston 20 when the piston wet property PN is high.

When the fuel accumulates on the wall surface of the cylinder 13, the mixture becomes easily dispersed as described above. Moreover, when fuel adheres to the piston 20, soot is generated during combustion. Therefore, it is desirable to perform fuel injection when a value of the adhering property AT and a value of the piston wet property PN are low.

Therefore, from trade-off between the adhering property AT and the piston wet property PN, the injection timing of the first injection IT1 is limited to a timing after the timing shown as NG1. Moreover, it is desirable that the injection timing of the second injection IT2 is a timing as close as possible to the first injection IT1. Therefore, although depending on the performance of the injector, the injection timing of the second injection IT2 becomes immediately after the first injection IT1.

A knock window KW must be avoided for the injection timing of the third injection IT3. Moreover, due to the trade-off between the adhering property AT and the piston wet property PN, the injection timing of the third injection IT3 is limited to a timing before the timing shown as NG2. From these limitations, when the fuel is injected in the three stage fuel injections in the present embodiment, the fuel is injected at the injection timing shown in FIG. 5.

However, the number of stages of injection is reduced according to the conditions, in the internal combustion engine 1 of the present embodiment. When the number of fuel injections is reduced, the order of injection that will not be performed is decided in advance. In the internal combustion engine 1 of the present embodiment, first, the third injection IT3 will not be performed. Next, the second injection IT2 will not be performed.

When the number of injections is reduced as such, the fuel may reach the wall surface of the cylinder 13 more easily every time the number of fuel injections decreases, as described above.

The controller 50 in the present embodiment reduces the number of fuel injections in accordance with a predetermined condition. For example, when the air flow meter is broken, a measurement of the intake air amount becomes inaccurate, and thus the number of fuel injections is reduced. Moreover, when the injector is broken, further load is given on the injector if performing the multistage injection, and thus the number of fuel injections is reduced.

When the fuel pump is broken, the fuel pressure cannot be maintained at a pressure of a predetermined range, and thus an injection pulse width becomes long. This accordingly makes it impossible to perform the multistage injection itself, and thus the number of fuel injections is reduced. Moreover, when the crank angle sensor is broken, the injection timing may be mistaken, and thus the number of fuel injections is reduced.

When a battery voltage is decreasing, it is impossible to increase the pressure several times within a short period in the drive circuit of the injector; thus, the number of fuel injections is reduced. Moreover, when the controller is generating heat, performing the multistage injection would cause the injector to be driven many times within a short time, and would further cause the controller 50 to generate heat. Accordingly, the number of fuel injections is reduced.

Due to various conditions as described above, the internal combustion engine 1 of the present embodiment is operated while the number of fuel injections varies. Accordingly, as described above, the fuel reaching and accumulating on the wall surface of the cylinder 13 also varies in accordance with this.

The mixture amount dispersed by the piston movement increases as the amount of the fuel reaching the wall surface increases and the accumulated amount of the mixture accumulated in the vicinity of the piston ring increases. Therefore, the controller 50 estimates that the dispersed amount of mixture is greater as the amount of fuel injected from the injector 11 reaching the wall surface of the cylinder 13 increases, and limits the upper limit torque low for the internal combustion engine 1. By making it as such, the upper limit torque UT can vary according to the amount of fuel reaching to the wall surface as shown by the arrow A1 of FIG. 4; hence, it is possible to prevent the occurrence of the pre-ignition.

Figure 6:
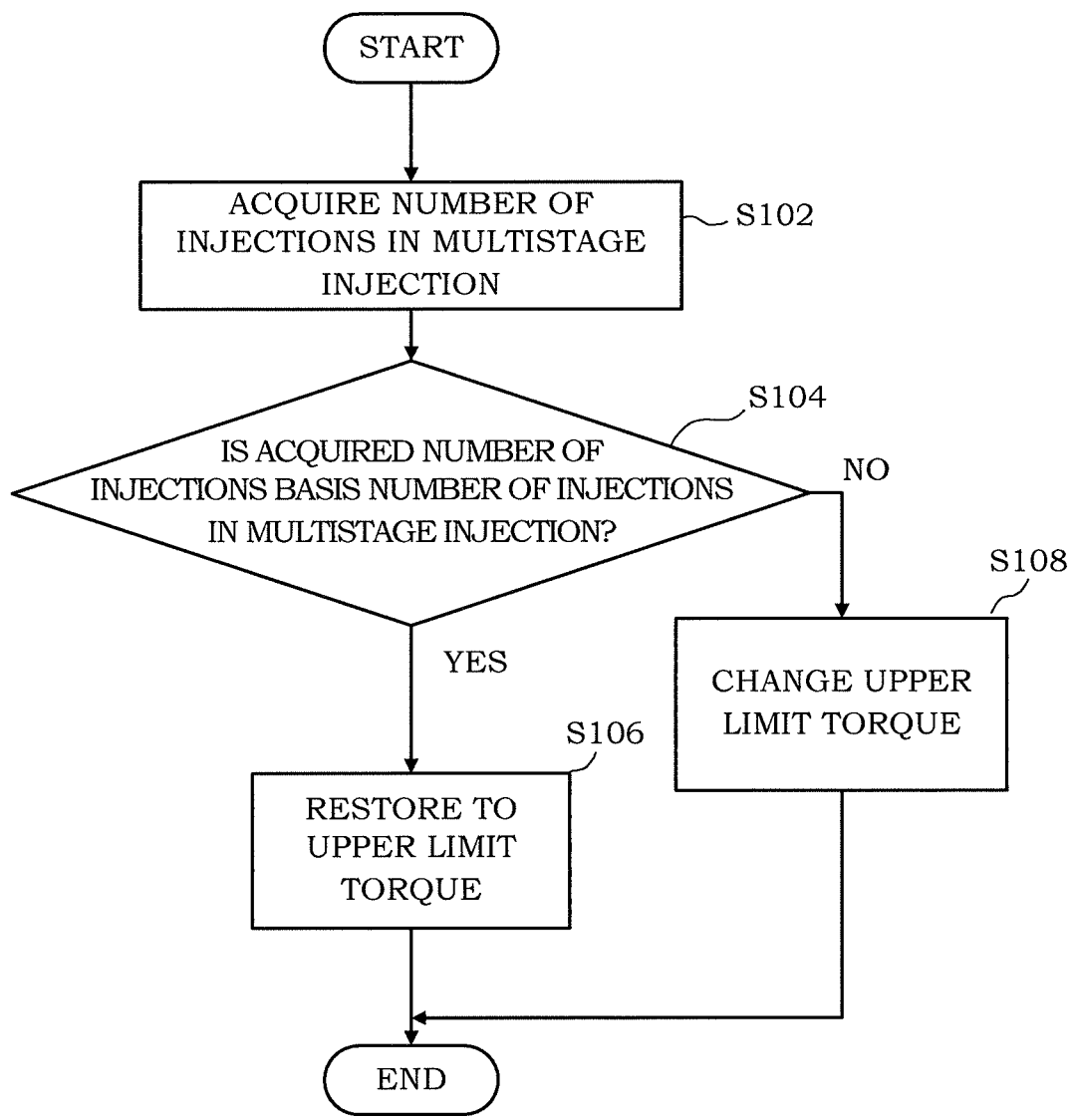
FIG. 6 is a flow chart describing a upper limit torque setting process in First Embodiment.
Figure 7:
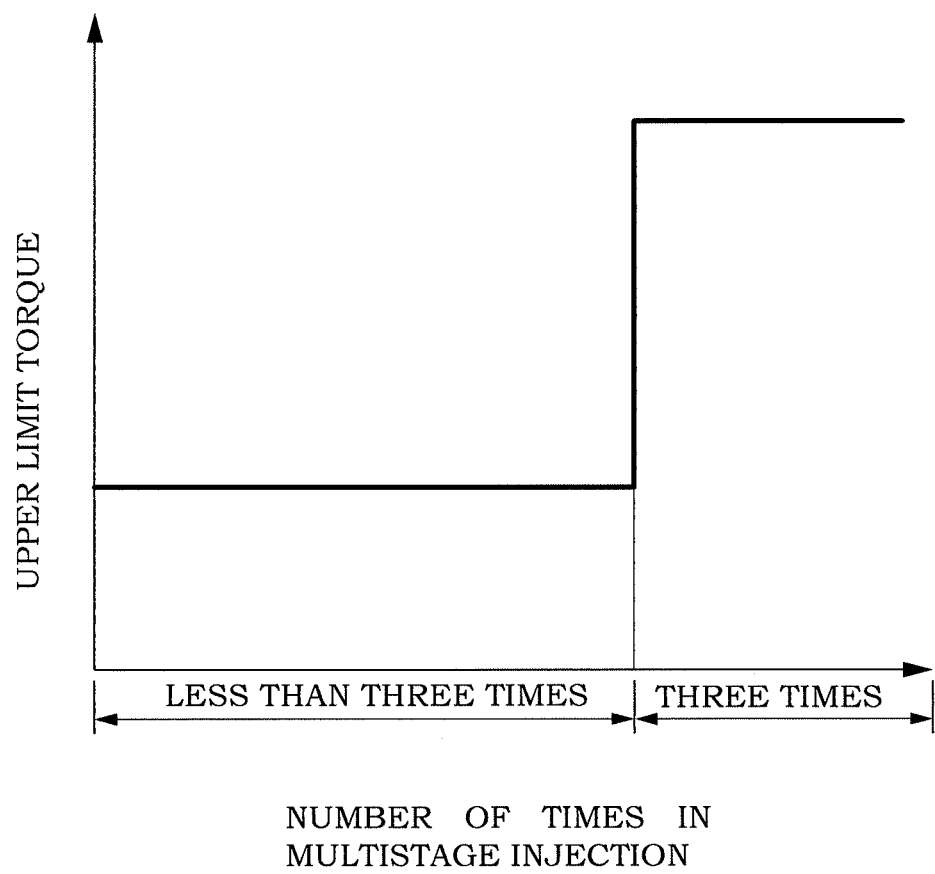
FIG. 7 is an explanatory drawing of a relationship between the number of fuel injections and the upper limit torque in First Embodiment.

FIG. 6 is a flow chart describing a upper limit torque setting process in First Embodiment. FIG. 7 is an explanatory drawing of a relationship between the number of fuel injections and the upper limit torque in First Embodiment. The relationship between the number of fuel injections and the upper limit torque shown in FIG. 7 is stored in a storage region of the controller 50, in advance. The following describes the upper limit torque setting process in First Embodiment with reference to these drawings. In First Embodiment, the processes from step S102 to step S108 described below are repetitively performed every predetermined time.

When the upper limit torque setting process starts, the controller 50 acquires a current number of fuel injections (S102). Why the current number of fuel injections is acquired here is because the number of fuel injections varies in real time due to predetermined conditions as described above.

Next, the controller 50 determines whether or not the current number of fuel injections is a basis number of fuel injections (S104). The basis number of fuel injections here is the number of fuel injections of when the fuel is injected with the most number of stages in the internal combustion engine 1. In the present embodiment, the basis number of fuel injections is three stages.

Next, in step S104, when the current number of fuel injections is the basis number of fuel injections (when the current number of fuel injections is three stages), the controller 50 makes the upper limit torque go back to the highest upper limit torque (FIG. 7) (S106), and makes the process go back to step S102. In this case, the number of fuel injections is large, and thus the amount of fuel reaching the wall surface is small. Accordingly, the controller 50 controls the internal combustion engine 1 without reducing the upper limit torque.

With a same amount of fuel injected within one stroke of the internal combustion engine 1, the larger the number of the fuel injections is, the less the amount of fuel injected per stage is. Therefore, the fuel atomizes before reaching the wall surface of the cylinder 13. Accordingly, it can be estimated that the fuel accumulating on the wall surface of the cylinder 13 is small in amount. If the amount of fuel accumulating on the wall surface of the cylinder 13 is small, the mixture containing the fuel and oil cannot be dispersed easily by the piston ring 21. Therefore, the pre-ignition cannot occur easily even if the upper limit torque is limited low.

On the other hand, in step S104, when the current number of fuel injections is not the basis number of fuel injections, the controller 50 changes the upper limit torque to a lower value (S108). In this case, the controller 50 is changed to the upper limit torque of a case in which the number of fuel injections is less than three stages (FIG. 7). At this time, the number of fuel injections is small, and thus a large amount of fuel reaches the wall surface. Therefore, the controller 50 limits the upper limit torque to a lower value.

With a same amount of fuel injected within one stroke of the internal combustion engine 1, the less the number of the fuel injections is, the more the amount of fuel injected per stage is. Thus, when the amount of fuel injected per stage is large, the fuel cannot easily atomize. Accordingly, it can be estimated that a large amount of fuel accumulates on the wall surface of the cylinder 13. With a larger amount of fuel accumulating on the wall surface of the cylinder 13, the mixture containing the fuel and oil can be dispersed easily by the piston ring 21. Therefore, the upper limit torque is limited to a lower value, and the internal combustion engine 1 is operated in a range far away from the range in which the pre-ignition may easily occur, to prevent the pre-ignition from occurring.

As such, in the first embodiment, when the current number of fuel injections is smaller than the basis number of fuel injections, the upper limit torque is limited lower than a case having the basis number of fuel injections, as shown in FIG. 7. By making it as such, output of the internal combustion engine 1 becomes limited, to avoid advancing into the range in which the pre-ignition can occur easily. This thus allows for preventing the occurrence of abnormal combustion within the cylinder of the internal combustion engine 1.

Figure 8:
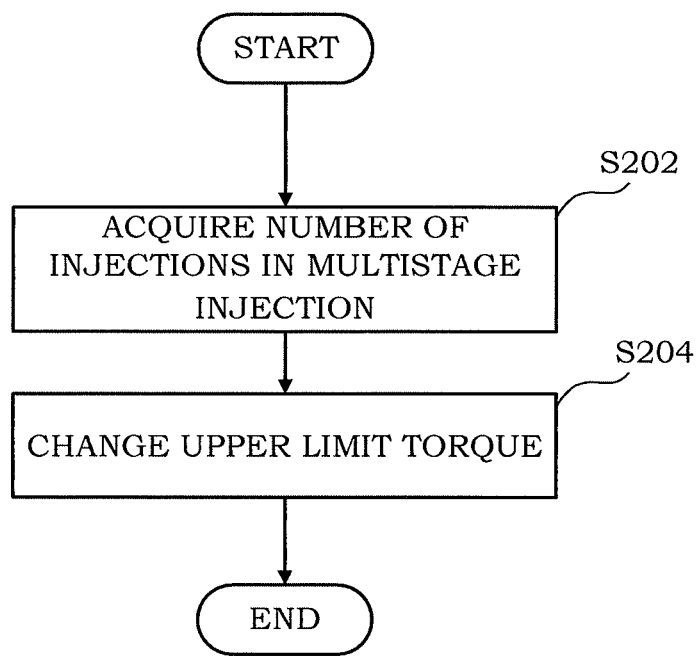
FIG. 8 is a flow chart describing a modification of a upper limit torque setting process in a modification of First Embodiment.
Figure 9:
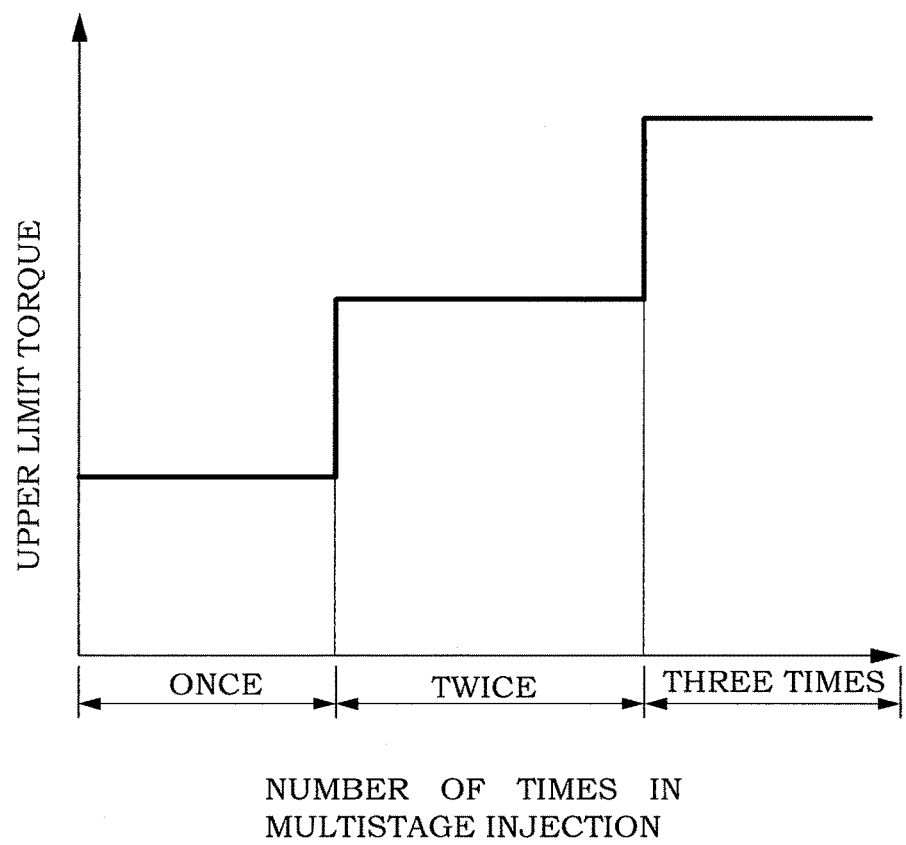
FIG. 9 is an explanatory drawing of a relationship between the number of fuel injections and the upper limit torque in a modification of First Embodiment.

FIG. 8 is a flow chart describing a modification of a upper limit torque setting process in a modification of First Embodiment. FIG. 9 is an explanatory drawing of a relationship between the number of fuel injections and the upper limit torque in a modification of First embodiment. Also in the modification of First Embodiment, the processes from step S202 to step S204 described below are repetitively carried out every predetermined time.

In the embodiment described above, the upper limit torque varies on the basis of whether or not the current number of fuel injections is the basis number of fuel injections; in the modification however, the upper limit torque varies gradually according to the current number of injection steps.

When the upper limit torque setting process starts, the controller 50 acquires a current number of fuel injections (S202). Next, the controller 50 changes the upper limit torque on the basis of the current number of fuel injections (S204).

In changing the upper limit torque, a map shown in FIG. 9 of a relationship between the number of injection steps and the upper limit torque is referred to. As shown in FIG. 9, in the modification, the upper limit torque is set lower as the number of fuel injections decreases. The relationship between the number of fuel injections and the upper limit torque shown in FIG. 9 is stored in advance in the storage region of the controller 50.

By referring to the map of FIG. 9, when the number of fuel injections is large, the controller 50 can perform output control of the internal combustion engine 1 without reducing the upper limit torque, since the amount of fuel reaching the wall surface is small. Moreover, when the number of fuel injections is small, the controller 50 can perform output control of the internal combustion engine 1 by reducing the upper limit torque, since the amount of fuel reaching the wall surface is large.

As such, the controller 50 can estimate that the amount of fuel reaching the wall surface is larger with a smaller number of the number of fuel injections of fuel injected within the cylinder 13. Therefore, the controller 50 can set the upper limit torque on the basis of the number of the fuel injections, and prevent the pre-ignition from occurring.

Second Embodiment

Figure 10:
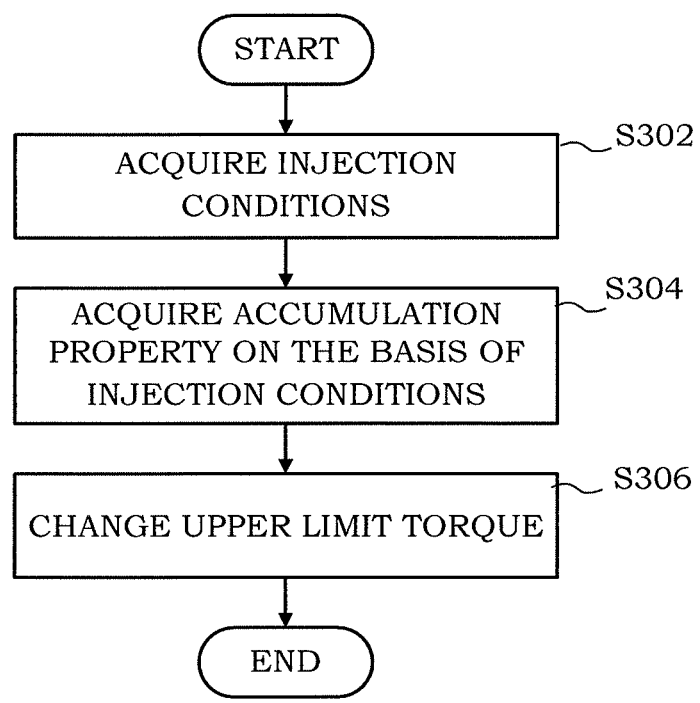
FIG. 10 is a flow chart describing a upper limit torque setting process in Second Embodiment.
Figure 11:
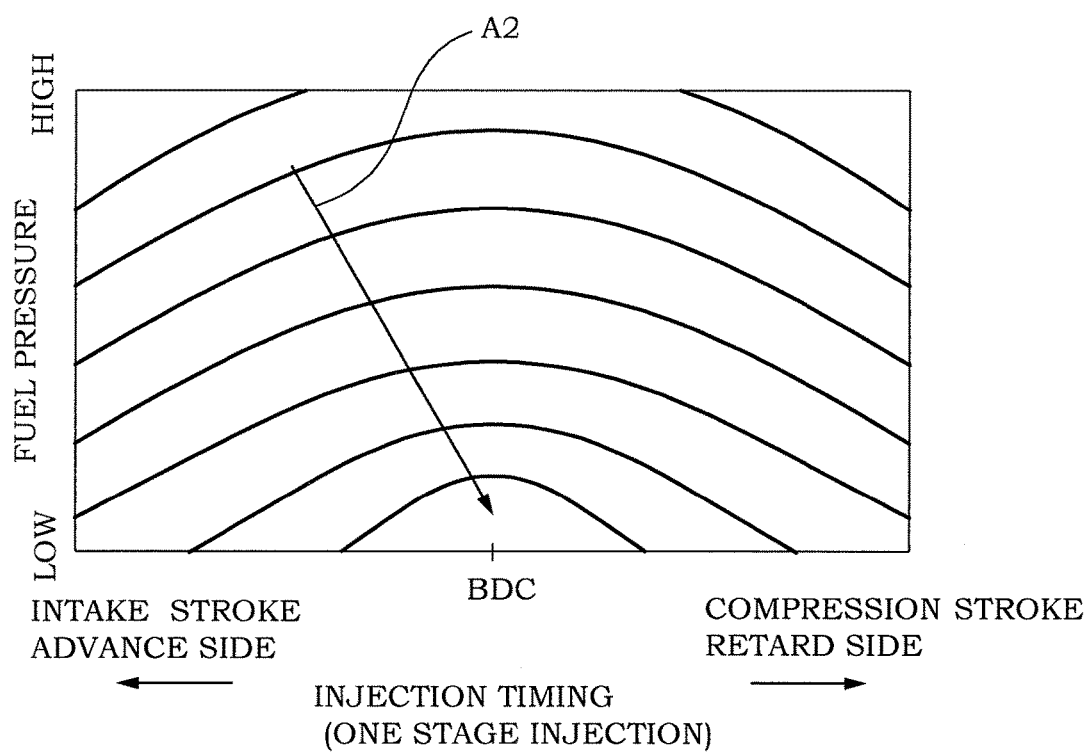
FIG. 11 is an explanatory drawing of one example of an accumulation property in Second Embodiment.
Figure 12:
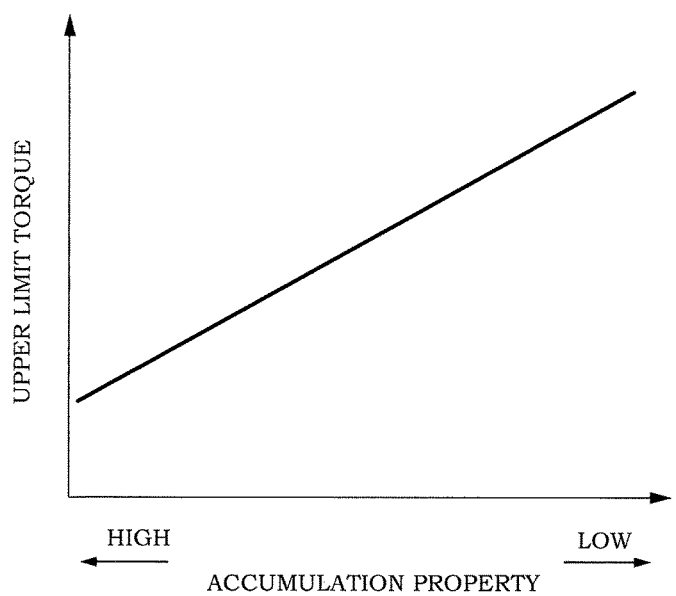
FIG. 12 is an explanatory drawing of a upper limit torque identified according to an accumulation property.

FIG. 10 is a flow chart describing a upper limit torque setting process in Second Embodiment. FIG. 11 is an explanatory drawing of one example of an accumulation property in Second Embodiment. FIG. 12 is an explanatory drawing of a upper limit torque identified according to an accumulation property. In Second embodiment also, the processes from step S302 to step S306 described below are repetitively performed every predetermined time.

In Second Embodiment, accumulation properties are obtained on the basis of injecting conditions, and a upper limit torque is set according to the obtained accumulation properties. The easiness of fuel reaching the wall surface of the cylinder 13 at least relates to the number of fuel injections, the injection timings, and fuel pressure. Therefore, in Second Embodiment, the number of fuel injections, the injection timings, and the fuel pressure are made to be the injecting conditions, and an accumulated fuel amount is estimated by the accumulation properties obtained on the basis of these injecting conditions, to change the upper limit torque. The accumulation properties indicate the easiness for the injected fuel to accumulate on the wall surface of the cylinder 13, and thus can be considered as equivalent to the estimated amount of accumulated fuel. The easiness of accumulation on the wall surface of the cylinder 13 shows the easiness for the fuel to reach the wall surface of the cylinder 13; thus, the accumulation property can be considered as equivalent to the amount of fuel reaching the wall surface of the cylinder 13.

When the upper limit torque setting process starts, the controller 50 acquires current injecting conditions (S302). In the present embodiment, the injecting conditions are, as described above, the number of fuel injections, the injection timings, and the fuel pressure.

Next, the controller 50 obtains the accumulation property according to the acquired current injecting conditions (S304). When the accumulation property is obtained, the controller 50 refers to the map shown in FIG. 11. FIG. 11 is a map showing the accumulation properties when the number of fuel injections is one stage. Such a map is stored in advance in the storage region of the controller 50. In this embodiment, although just the map showing the accumulation properties when the number of fuel injections is one stage is shown as an example in FIG. 11, other than this, a map of when the number of fuel injections is two stages and a map of when the number of fuel injections is three stages are stored in advance in the storage region of the controller 50.

Contour lines shown in the map of FIG. 11 represent the accumulation properties. Furthermore, these contour lines show that the fuel easily accumulates as the lines approach in the direction shown by arrow A2 in FIG. 11. For example, the lower the fuel pressure, the more difficult it is for the fuel to atomize within the combustion chamber, and thus the fuel can easily reach the wall surface of the cylinder 13. Accordingly, a lower fuel pressure would exhibit a higher accumulation property. Moreover, the wall surface of the cylinder 13 is exposed towards the injector 11 the most when the number of fuel injections is one stage and at a time when the injection timing is at the bottom dead center. Therefore, the closer the fuel injection timing is to the bottom dead center, the higher the accumulation property.

When the map is referred to and the accumulation property is acquired, the controller 50 changes the upper limit torque according to the accumulation properties (S306). In changing the upper limit torque, a map as shown in FIG. 12 is referred to. The map shown in FIG. 12 is stored in advance in the storage region of the controller 50.

The map shown in FIG. 12 shows a upper limit torque with respect to the accumulation properties. Furthermore, this map sets the upper limit torque higher with a lower accumulation property. This represents that the lesser the amount of fuel adhered to the wall surface of the cylinder 13, the lesser the pre-ignition can occur according to the principles described above. In other words, the higher the accumulation properties, the lower the upper limit torque is set. This represents that the larger the amount of fuel is adhered on the wall surface of the cylinder 13, the easier the pre-ignition can occur according to the principles above.

As such, when the upper limit torque varies, the internal combustion engine 1 is controlled within an output range not exceeding this upper limit torque.

As such, the controller 50 estimates that the amount of fuel reaching the wall surface is larger with a lower fuel pressure of the fuel injected within the cylinder 13, and limits the upper limit torque of the internal combustion engine 1 low; hence, this allows for preventing the pre-ignition from occurring. Moreover, the controller 50 estimates that the amount of fuel reaching the wall surface is larger when the injection timing of the fuel injected within the cylinder 13 is closer to the bottom dead center of the piston 20, and limits the upper limit torque of the internal combustion engine 1 low; hence, this allows for preventing the pre-ignition from occurring.

Moreover, in the present embodiment, the accumulation property is obtained on the basis of the three elements, namely the number of fuel injections, the injection timing, and the fuel pressure. Thus, it is possible to obtain the accumulation property more accurately. Furthermore, the upper limit torque varies on the basis of the more accurately obtained accumulation property. Thus, it is possible to limit the upper limit torque more accurately. Furthermore, it is possible to control the internal combustion engine 1 without limiting the upper limit torque more than necessary.

In this embodiment, although the fuel accumulated amount is multiplied according to the number of fuel injections, the injection timing, and the fuel pressure, the accumulation property may be obtained according to any one or two of the number of fuel injections, the injection timing, and the fuel pressure.

Figure 13:
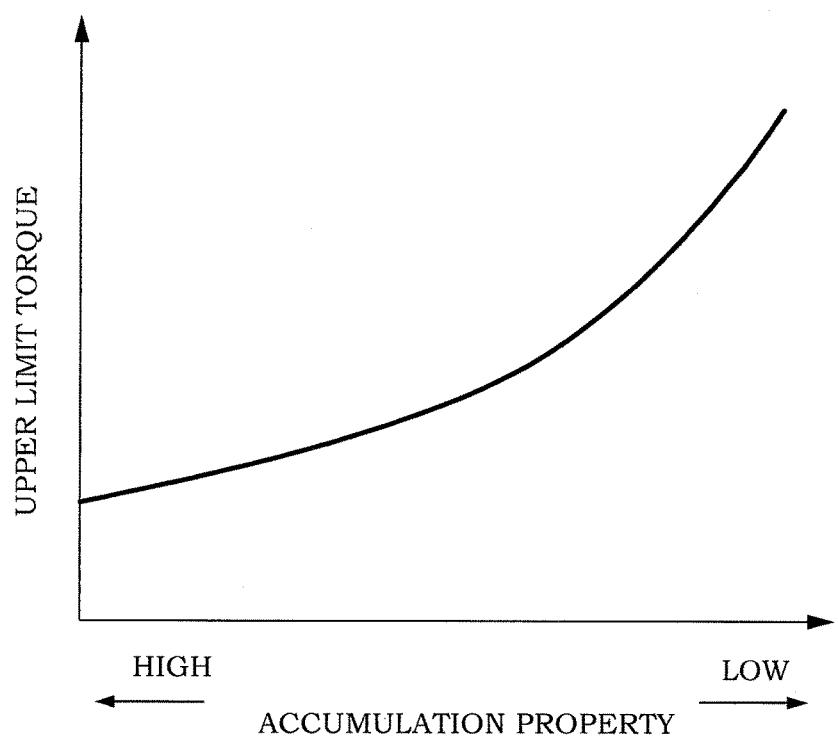
FIG. 13 is an explanatory drawing of a modification of a upper limit torque identified according to an accumulation property.

FIG. 13 is an explanatory drawing of a modification of a upper limit torque identified according to an accumulation property. In Second Embodiment described above, the relationship between the accumulation properties and the upper limit torque are of a linear relationship. However, as shown in FIG. 13, the relationship between the accumulation properties and the upper limit torque may be non-linear. The form of having the relationship between the accumulation properties and the upper limit torque non-linear is not limited to the form shown in FIG. 13.

In Second Embodiment, the accumulation property is once obtained on the basis of the injecting conditions, and the upper limit torque is obtained on the basis of this accumulation property. The reason why the upper limit torque is obtained through the accumulation property as such is because, for example, there are cases in which the relationship between the accumulation properties and the upper limit torque as shown in FIG. 12 and the relationship between the accumulation properties and the upper limit torque as shown in FIG. 13 are preferably used upon switching between the two, depending on certain conditions. Even in such a case, the upper limit torque can be obtained through the accumulation properties; it is thus possible to easily obtain the upper limit torque according to the switching.

Third Embodiment

Figure 14:
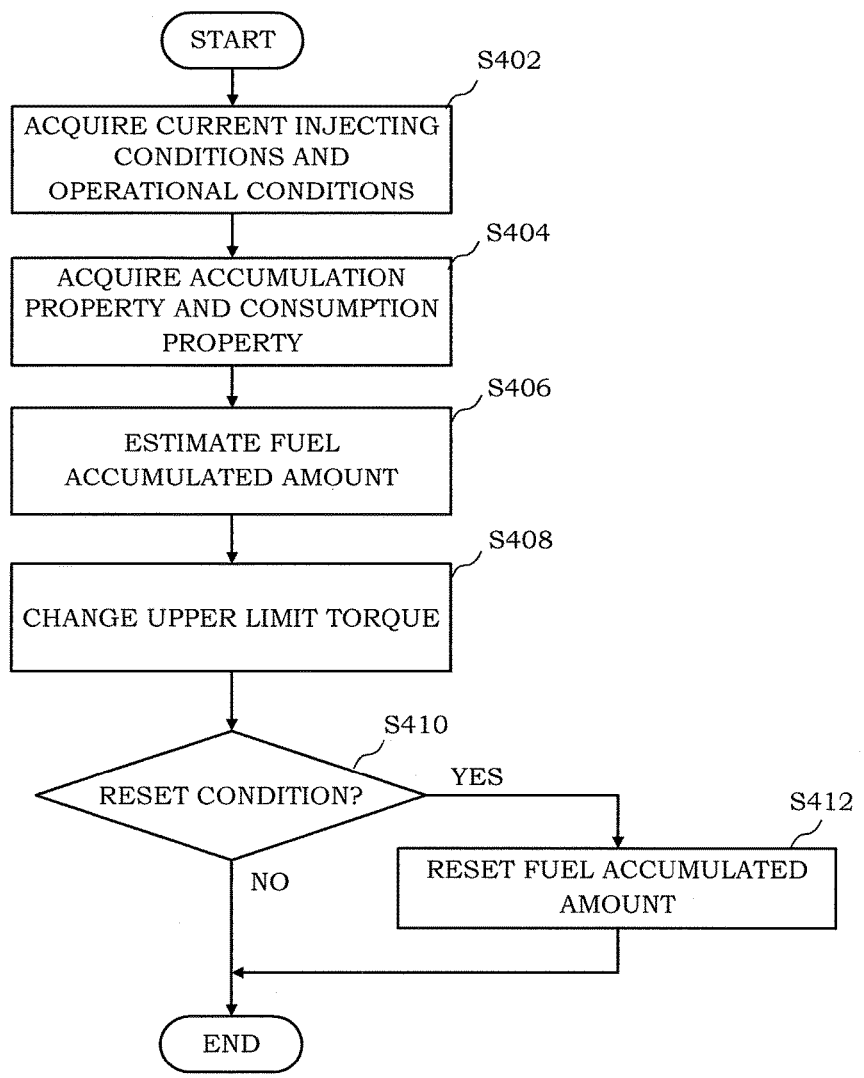
FIG. 14 is a flow chart describing a upper limit torque setting process in Third Embodiment.
Figure 15:
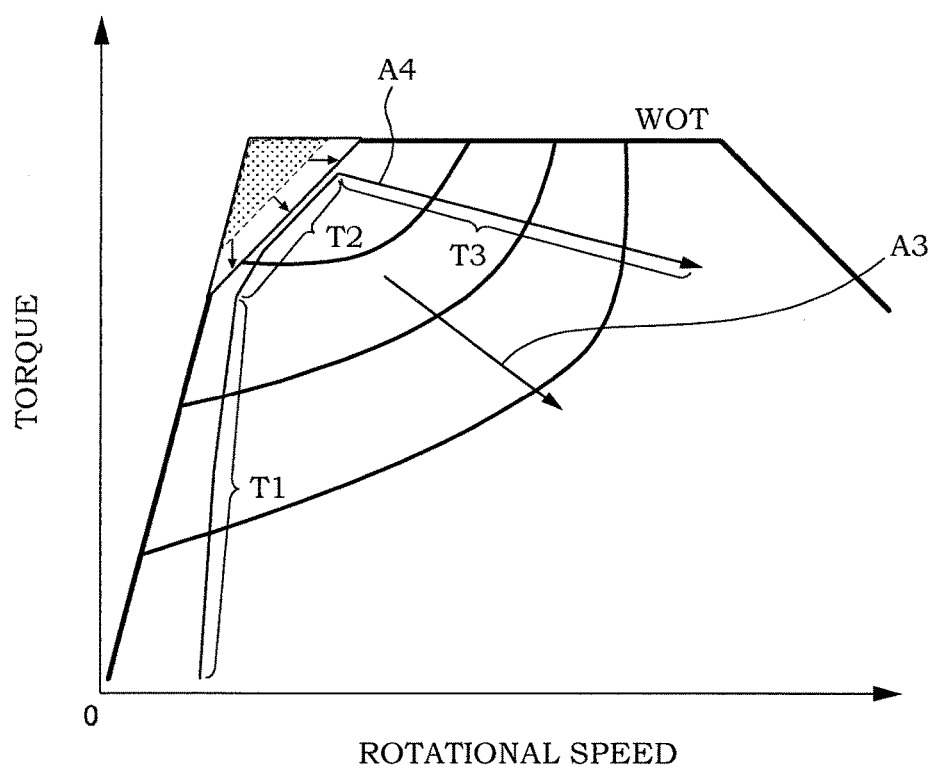
FIG. 15 is a map representing consumption properties in Third Embodiment.
Figure 16:
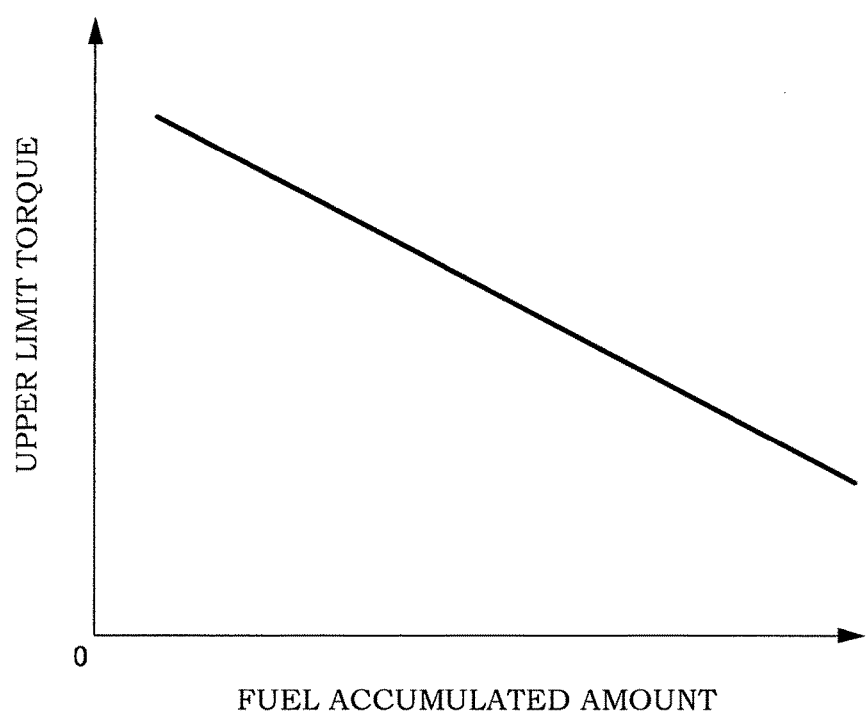
FIG. 16 is an explanatory drawing of a relationship between fuel accumulated amounts and the upper limit torque in Third Embodiment.

FIG. 14 is a flow chart describing a upper limit torque setting process in Third Embodiment. FIG. 15 is a map representing consumption properties in Third Embodiment. FIG. 16 is an explanatory drawing of a relationship between fuel accumulated amounts and the upper limit torque in Third Embodiment. In Third Embodiment also, the processes from step S402 to step S412 described below are repetitively performed every predetermined time.

In First Embodiment described above, the upper limit torque is set according to the current number of fuel injections. Moreover, in Second Embodiment, the upper limit torque is set according to the current injecting conditions. In comparison, Third Embodiment acquires the accumulation properties in the injecting conditions and the consumption properties in operational conditions, and estimates the current fuel accumulated amount by continuously multiplying and deducting the fuel accumulated amount on the basis of these properties. Furthermore, the upper limit torque varies on the basis of the fuel accumulated amount estimated more accurately.

When the upper limit torque setting process starts, the controller 50 acquires the current injecting conditions and the operational conditions (S402). In Third Embodiment also, the injecting conditions are the number of fuel injections, the injection timings, and the fuel pressure. Moreover, the operational conditions are the torques of the internal combustion engine 1 and the revolution speeds.

Next, the controller 50 acquires the accumulation property and the consumption property on the basis of the acquired injecting conditions and the operational conditions (S404). The accumulation property serves as an element causing the fuel accumulated amount to increase. On the other hand, a fuel consumption amount serves as an element causing reduction in a multiplied fuel accumulated amount.

The accumulation property can be acquired by a similar technique as the technique in Second Embodiment described above. More specifically, the controller 50 applies the injecting conditions to the map of the accumulation properties shown in FIG. 11 and obtains the accumulation property.

On the other hand, when the consumption property is obtained, a map as shown in FIG. 15 is referred to. FIG. 15 shows the consumption properties with respect to the revolution speeds and torques. Furthermore, contour lines of consumption properties are shown on an inner side of the torque curves. Furthermore, the consumption properties increase as the lines advance towards the direction of the arrow A3. The map as shown in FIG. 15 is stored in advance in the storage region of the controller 50.

Next, the controller 50 obtains the fuel accumulated amount on the basis of the obtained accumulated property and consumption property (S406). The fuel accumulated amount is obtained by multiplying the accumulation property to the fuel accumulated amount obtained previously, and further deducting the consumption property. Representing a time element as t, this relationship will be as in the following formula:

Fuel accumulated amount (*t*)=fuel accumulated amount (*t*−1)+fuel property (*t*)−consumption property (*t*)

Next, the controller 50 changes the upper limit torque on the basis of the obtained fuel accumulated amount (S408). The upper limit torque is changed by referring to the map shown in FIG. 16. FIG. 16 shows the upper limit torques corresponding to the fuel accumulated amounts. Furthermore, in FIG. 16, the relationship between the fuel accumulated amounts and the upper limit torques is that when the fuel accumulated amount is high, the upper limit torque is made low. The map as shown in FIG. 16 is stored in the storage region of the controller 50 in advance.

Next, the controller 50 determines whether or not a reset condition is met (S410). In this embodiment, the reset condition is, for example, whether or not a predetermined time has elapsed after an ignition key has been cut.

When the reset condition is met, the controller 50 resets the fuel accumulated amount (S412). The resetting of the fuel accumulated amount is to make the fuel accumulated amount be "0", for example. However, the resetting of the fuel accumulated amount is not limited to this, and for example, the reset value may be changed according to a time further elapsed after an elapse of a predetermined time.

As such, the fuel accumulated amount is reset when the resetting condition is met, since it is considered that after a predetermined time elapses after the ignition key is cut, the accumulated fuel vaporizes and disappears.

In a case in which the reset condition is not met, or after step S412 is performed, the controller 50 performs step S402. Thereafter, the processes from step S402 to step S412 described above are repeated.

As such, when the upper limit torque varies, the internal combustion engine 1 is controlled within an output range not exceeding this upper limit torque.

Figure 17:
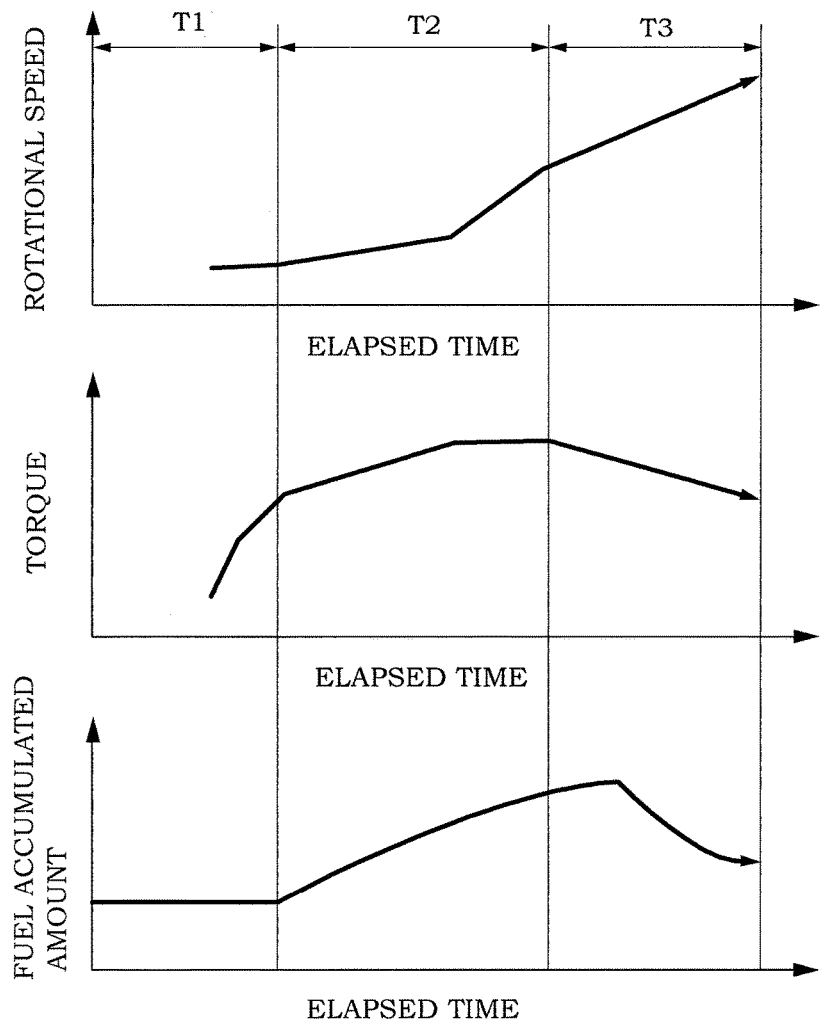
FIG. 17 is an explanatory drawing of revolution speed, torque, and fuel accumulated amounts with respect to time elapse, in Third Embodiment.

FIG. 17 is an explanatory drawing of revolution speed, torque, and fuel accumulated amount according to a time elapsed, in Third Embodiment. These drawings show how the revolution speed, torque, and fuel accumulated amount transition with the elapse of time, when the internal combustion engine output varies as in the arrow A4 in FIG. 15. In FIG. 17, time widths T1, T2, and T3 are shown; these correspond to T1, T2, and T3 shown in FIG. 15, respectively.

Referring to the arrow A4 of FIG. 15, the revolution speed first increases gradually with the elapse of time, and furthermore, the torque also increases (T1 of FIG. 15 and FIG. 17). Accordingly, the arrow A4 gradually advances into a range in which fuel is difficult to consume.

Thereafter, as the revolution speed increases, the torque reaches the upper limit torque (T2 in FIG. 15 and FIG. 17). Therefore, although the revolution speed increases, the torque cannot exceed an increasing torque. At this time, the arrow A4 enters into the range of a consumption property in which fuel is not easily consumed; thus, the fuel accumulated amount also increases (T2 in FIG. 15 and FIG. 17).

As the revolution speed further increases, the arrow A4 enters into a range of a consumption property in which fuel is easily consumed (T3 in FIG. 15 and FIG. 17). Accordingly, the fuel accumulated amount also gradually decreases.

As such, in Third Embodiment, the controller 50 estimates the current fuel accumulated amount by multiplying the accumulation property to the fuel accumulated amount and deducting the consumption property, at every moment. Accordingly, the fuel accumulated amount can be estimated more accurately. This allows for obtaining the upper limit torque and performing the upper limit torque control, on the basis of a more accurate fuel accumulated amount.

At this time, the controller 50 reduces the fuel accumulated amount with a higher revolution speed of the internal combustion engine 1. By making it as such, it is possible to reduce the fuel accumulated amount according to the revolution speed of the internal combustion engine 1, and change the fuel accumulated amount at every moment.

Moreover, the controller 50 resets the fuel accumulated amount to a predetermined value upon elapse of a predetermined time from when the internal combustion engine 1 is stopped. By making it as such, it is possible to match an actual fuel accumulated amount vaporized and reduced at the time of stopping the internal combustion engine with the estimated fuel accumulated amount.

In this embodiment, although the fuel accumulated amount is multiplied according to the three injecting conditions, being the fuel pressure, the number of fuel injections, and the injection timings, the fuel injected amount can be multiplied according to any one or two of the fuel pressure, the number of fuel injections, and the injection timings.

Fourth Embodiment

Figure 18:
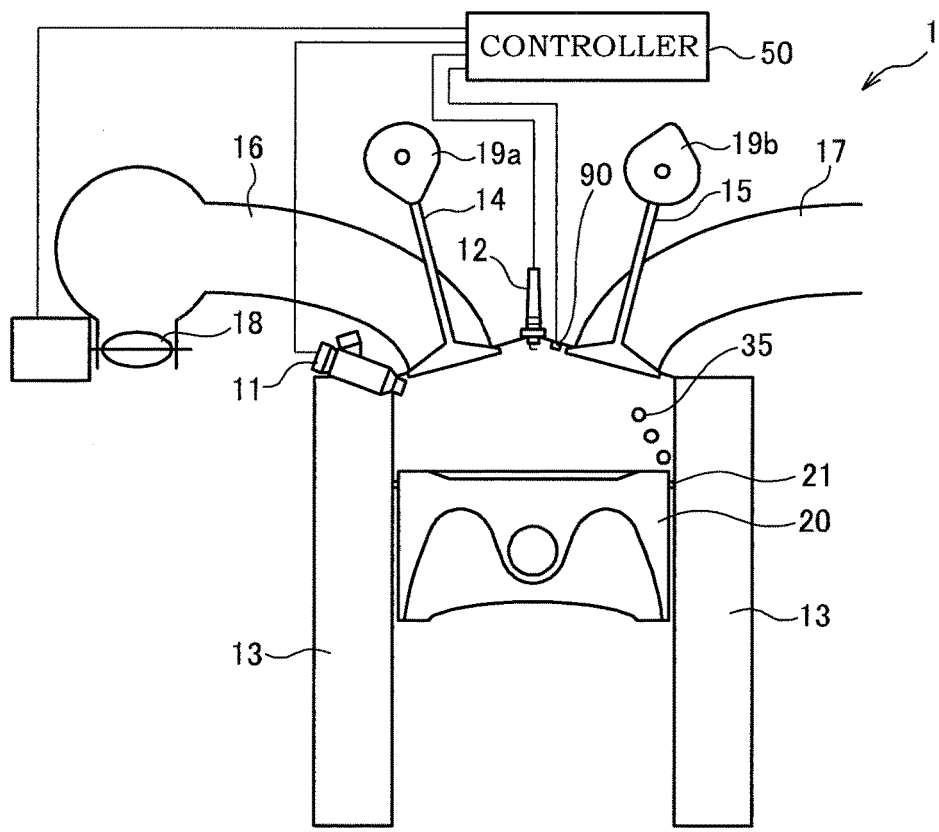
FIG. 18 is an explanatory drawing of an internal combustion engine in Fourth Embodiment.
Figure 19:
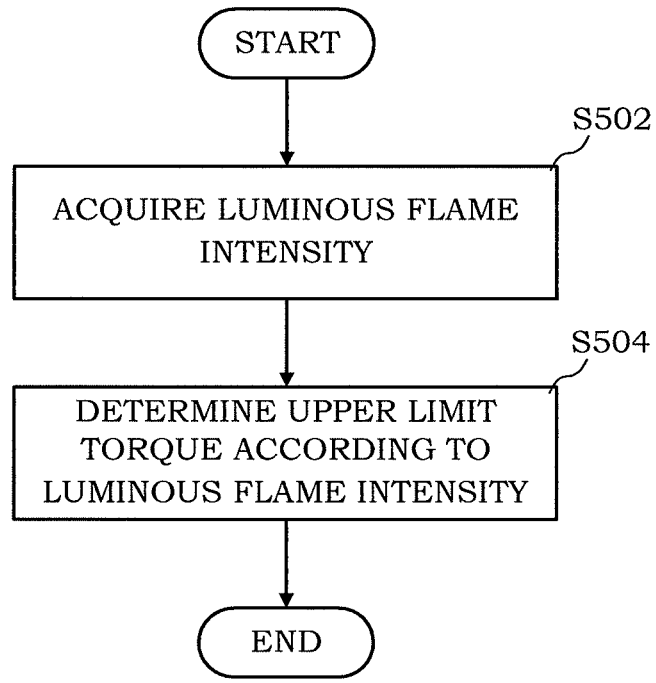
FIG. 19 is a flow chart describing a upper limit torque setting process in Fourth Embodiment.
Figure 20:
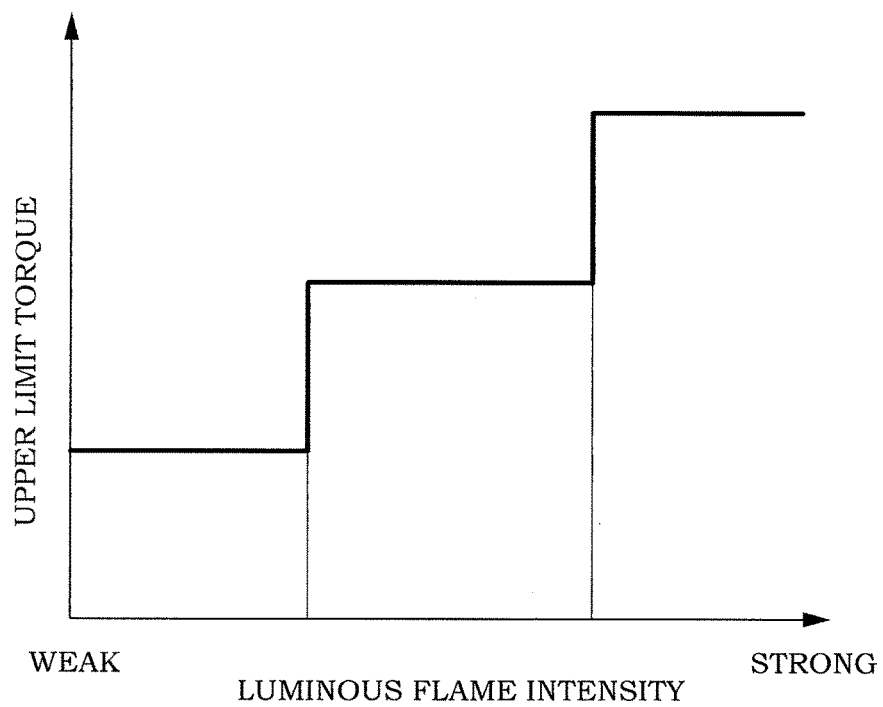
FIG. 20 is an explanatory drawing of a relationship between luminous flame intensity and the upper limit torque in Fourth Embodiment.

FIG. 18 is an explanatory drawing of an internal combustion engine in Fourth Embodiment. FIG. 19 is a flow chart describing a upper limit torque setting process in Fourth Embodiment. FIG. 20 is an explanatory diagram of a relationship between luminous flame intensities and the upper limit torques in Fourth embodiment. In Fourth Embodiment, the upper limit torque is limited according to a luminous flame intensity detected within the combustion chamber. In Fourth Embodiment also, the processes from step S502 to step S504 described below are repetitively performed every predetermined time.

In conducting Fourth Embodiment, an ion sensor 90 is disposed in the internal combustion engine 1, as shown in FIG. 18. The ion sensor 90 is electrically connected to the controller 50. The ion sensor 90 can be provided at a cylinder head as shown in FIG. 18. The ion sensor 90 of a type integrated with an ignition plug can be employed.

When the upper limit torque setting process starts, the controller 50 acquires a luminous flame intensity sent from the ion sensor 90 (S502). Supposing that the fuel is already accumulating in the vicinity of the piston ring within the cylinder, in such a case, the dispersion of the mixture would also have occurred already. Furthermore, the possibility that pre-ignition may occur having the mixture serving as the ignition source would also be increasing. Accordingly, the ion sensor 90 detects the luminous flame intensity caused by the mixture dispersion. Furthermore, the controller 50 acquires the luminous flame intensity detected by the ion sensor 90.

The controller 50 limits the upper limit torque according to the luminous flame intensity detected by the ion sensor 90 (S504). At this time, a map shown in FIG. 20 is referred to. The map shown in FIG. 20 is stored in the storage region of the controller 50.

According to the map shown in FIG. 20, the weaker the luminous flame intensity is, the lower the upper limit torque is limited to. Since the dispersed amount of the mixture is estimated as being more in amount with a stronger luminous flame intensity, it is possible to determine that there is a high possibility the pre-ignition may occur. Therefore, in order to prevent the pre-ignition from occurring, the upper limit torque is limited.

As such, the internal combustion engine 1 in Fourth embodiment includes an ion sensor 90 adapted to detect a luminous flame within a cylinder, and the controller 50 estimates a mixture amount that disperses on the basis of an output from the ion sensor, and limits the upper limit torque of the internal combustion engine 1 more with a larger amount of the dispersing amount of mixture. Thus, it is possible to prevent the abnormal combustion within the cylinder from occurring, in the internal combustion engine 1.

In the above embodiments, a form in which the fuel adheres to the wall surface of the cylinder 13 relatively easily is described, however it is not limited to the form as such in which an injecting hole of the injector 11 is attached to the internal combustion engine 1 to face the wall surface of the cylinder 13.

The embodiments of the present invention are described above, however the present embodiments merely show one part of the applications of the present invention, and do not intend to limit the technical scope of the present invention to the specific configurations in the above embodiments.

Each of the embodiments described above are explained as separate embodiments, however these can be combined as appropriate.

The invention claimed is:

1. A control device of an internal combustion engine, comprising:
    an estimating device adapted to estimate an amount of a mixture of fuel and oil that is dispersed by a movement of a piston within a cylinder; and
    a limiting device adapted to limit an upper limit torque of an internal combustion engine, according to the estimated amount of the mixture,
    wherein the estimating device estimates the amount of the mixture based on i) an accumulation amount, which is determined based on a) a fuel injection timing and b) a fuel pressure, and ii) a consumption amount, which is determined based on a) an engine rotation speed and b) an engine torque.

2. The control device of an internal combustion engine according to claim 1, wherein the limiting device limits the upper limit torque of the internal combustion engine lower with a larger amount of the estimated amount of the mixture.

3. The control device of an internal combustion engine according to claim 2, wherein the estimating device estimates that the amount of the mixture is larger as the accumulation amount of fuel, which is injected by the fuel injection device, reaching the wall surface in the cylinder is larger.

4. The control device of an internal combustion engine according to claim 3, wherein the estimating device estimates that the accumulation amount of fuel reaching the wall is larger with a smaller number of fuel injections being injected within the cylinder.

5. The control device of an internal combustion engine according to claim 3, wherein the estimating device estimates that the accumulation amount of fuel reaching the wall is larger with a lower fuel pressure of fuel being injected within the cylinder.

6. The control device of an internal combustion engine according to claim 3, wherein the estimating device estimates that the accumulation amount of fuel reaching the wall is larger when an injection timing of fuel being injected within the cylinder is closer to a bottom dead center of the piston.

7. A control method of an internal combustion engine, comprising:
    estimating an amount of a mixture of fuel and oil that is dispersed by a piston movement within a cylinder, wherein the estimated amount of the mixture is estimated based on i) an accumulation amount, which is determined based on a) a fuel injection timing and b) a fuel pressure, and ii) a consumption amount, which is determined based on a) an engine rotation speed and b) an engine torque; and
    limiting an upper limit torque of an internal combustion engine according to the estimated amount of the mixture.

8. A control device of an internal combustion engine, comprising:
    estimating means adapted to estimate an amount of a mixture of fuel and oil that is dispersed by a movement of a piston within a cylinder; and
    limiting means adapted to limit an upper limit torque of an internal combustion engine, according to the estimated amount of the mixture,
    wherein the estimating means estimates the amount of the mixture based on i) an accumulation amount, which is determined based on a) a fuel injection timing and b) a fuel pressure, and ii) a consumption amount, which is determined based on a) an engine rotation speed and b) an engine torque.

* * * * *